(12) United States Patent
Matsuo et al.

(10) Patent No.: US 6,762,806 B1
(45) Date of Patent: Jul. 13, 2004

(54) DISPLAY DEVICE PROVIDED WITH A HOLDER FOR HOUSING THE LIGHT SOURCE THE LIGHT GUIDE PLATE AND THE NON-LIGHT EMITTING DISPLAY DEVICE

(75) Inventors: Hiroto Matsuo, Gifu (JP); Isao Takemoto, Gifu (JP); Naoki Tsukamoto, Saitama (JP); Tatsumi Segawa, Gifu (JP)

(73) Assignee: Sanyo Electric Co., Ltd., Osaka-fu (JP)

( * ) Notice: Subject to any disclaimer, the term of this patent is extended or adjusted under 35 U.S.C. 154(b) by 23 days.

(21) Appl. No.: 09/599,018

(22) Filed: Jun. 21, 2000

(30) Foreign Application Priority Data

Jun. 22, 1999 (JP) .......................................... 11-176072

(51) Int. Cl.⁷ ............................................ G02F 1/1333
(52) U.S. Cl. ........................................... 349/58; 349/60
(58) Field of Search .............................. 349/58, 60, 65, 349/113

(56) References Cited

U.S. PATENT DOCUMENTS

| | | | |
|---|---|---|---|
| 5,334,993 A | * 8/1994 | Okajima et al. | ............ 345/102 |
| 5,461,547 A | * 10/1995 | Ciupke et al. | ................ 362/31 |
| 5,704,703 A | * 1/1998 | Yamada et al. | ............... 362/27 |
| 5,729,310 A | * 3/1998 | Horiuchi et al. | .............. 349/62 |
| 5,739,879 A | 4/1998 | Tsai | |
| 5,886,759 A | * 3/1999 | Mashino et al. | .............. 349/65 |
| 5,905,550 A | * 5/1999 | Ohgami et al. | ............... 349/58 |
| 6,016,175 A | * 1/2000 | Kim | ............................ 349/58 |
| 6,313,891 B1 | * 11/2001 | Nagakubo et al. | ............ 349/65 |

FOREIGN PATENT DOCUMENTS

| | | |
|---|---|---|
| EP | 0 582 009 A1 | 2/1994 |
| JP | 60-129178 | 8/1985 |
| JP | 4-27487 | 3/1992 |
| JP | 7-218729 | 8/1995 |
| JP | 8-122746 | 5/1996 |
| JP | 8-152624 | 6/1996 |
| JP | 9-133921 | 5/1997 |
| JP | 10-112214 | 4/1998 |
| JP | 10-115829 | 5/1998 |
| JP | 10-319400 | 12/1998 |
| JP | 11-176072 | 5/2002 |
| KR | 10-0395865 | 8/2003 |

OTHER PUBLICATIONS

Abstract of Japanese Patent Publ. No. 04355428A; dated Dec. 9, 1992.

* cited by examiner

Primary Examiner—Robert H. Kim
Assistant Examiner—Andrew Schechter
(74) Attorney, Agent, or Firm—Arent Fox PLLC (57) ABSTRACT

A holder for holding a display device is divided into a first holder (5) and a second holder (6), and a light source housing chamber (10) for housing a light source (1) is also divided so that a work for mounting the light source (1) to the light source housing chamber (10) becomes easy. A first reflector (55) and a second reflector (65) integrally formed with the holder and having a reflecting surface corresponding to a light emitting part of the light source (1) are provided in the light source housing chamber (10), thus a certain space is secured around the light source, the light is efficiently incident to a light guide plate, and a separately formed reflector becomes unnecessary.

9 Claims, 6 Drawing Sheets

DISPLAY DEVICE PROVIDED WITH A HOLDER FOR HOUSING THE LIGHT SOURCE THE LIGHT GUIDE PLATE AND THE NON-LIGHT EMITTING DISPLAY DEVICE

BACKGROUND OF THE INVENTION

1. Field of the Invention

This invention relates to a display device such as a liquid crystal display having a back light for illuminating from behind.

2. Description of the Prior Art

A non-light emitting display device such as a liquid crystal display has a back light unit for illuminating from behind. The back light unit comprising, for example, a line-shaped light source such as a cold-cathode tube fluorescent light, a light guide plate for introducing light emitted by a light source through a side surface facing to the light guide plate and emitting the light from an emitting surface, a reflector for efficiently introducing light from the light source to the inside of the light guide plate by using reflecting surfaces which are surfaces around the light source except for a side surface facing to the light source, and a reflecting sheet for returning light escaping from a back surface of the light guide plate to the light guide plate again, which is provided on a back surface of the light guide plate. If necessary, a lens sheet for improving the brightness by condensing light emitted from the emitting surface within a visible angle, and a diffusing plate for leveling off the brightness are provided above the emitting surface. These elements are housed in a holder for forming an outward shape of a back light unit.

A liquid crystal display panel is housed in a metal frame which holds the liquid crystal display panel around a proximity of side surfaces and has an opening serving as a display area, and the display panel is combined with a back light unit. (See JP, 4-355428, A as one example.) For combining the back light unit and the liquid crystal display panel, a mechanism for engaging either of the holder or the frame with the other, or both of them are housed in an other holder forming an entire display device unit.

A sheet-shaped reflector of which an inner surface is generally a reflecting surface is arranged around the light source, and an end surface of the reflector is adhered and fixed to the light guide plate.

It is required to fix the reflector so as to correspond to the light guide plate, and it causes a large amount of time and labor. In addition, such a work demands considerable accuracy and prevents improvement of assembling workability, causing an increase in cost.

The sheet shaped reflector is difficult to retain a desired shape since it is easily deformed, although the sheet-shape reflector can be fixed to the light guide plate in proper condition. And a sufficient space between the light source and the reflector can not be secured. In a case that a sufficient space can not be secured, even though light radiated to a direction other than a side surface of the light guide plate (an incident surface), that is light radiated to upper and lower directions or behind of the light source, is reflected to the reflector, some of light may travel to the light source and can not be incident to the side surface of the light guide plate (an incident surface) efficiently. Then, when an amount of light incident to the light guide plate decreases because the light from the light source can not be incident efficiently. An amount of light emitted from the light guide plate also decreases and a desired brightness can not be obtained.

Some reflectors are formed with special hard materials which are not deformative, however, they also requires a large amount of time and labor, and considerable accuracy in mounting works as in a case of a sheet-shaped reflector. Therefore the workability is degraded, causing an increase in cost.

SUMMARY OF THE INVENTION

This invention was made to solve these problems. The invention has an objective to provide a display device in which a predetermined space between a light source and a surface other than a side surface of a light guide plate is secured so as to obtain sufficient brightness for illumination by efficiently utilizing light emitted from the light source. Furthermore, the display device according to the present invention does not require a work for fixing a reflector to a light guide plate so that the display device can improve assembling workability and accuracy and contribute to cost reduction.

A display device according to the present invention comprises a light source, a light guide plate for introducing light emitted by the light source to an incident surface on a side of the light guide plate and emitting the light from an emitting surface, a non-light emitting display device which is illuminated by light emitted from the light guide plate, and a holder for housing the light source, the light guide plate, and the non-light emitting display device. The holder includes a first holder having a back surface for covering at least a back surface of the light guide plate, a second holder having an opening corresponding to a display area of the non-light emitting display device and formed dividably from the first holder, and a light source housing chamber for housing the light source having an opening corresponding to the incident surface of the light guide plate is formed by combining the first and second holders.

The first holder includes a first housing area formed in a lower part of the light source housing chamber, and the second holder includes a second housing area formed in an upper part of the light source housing chamber.

In this invention, a holder for holding the entire display device is divided into two pieces, and a light source housing chamber for housing the light source is also divided, and thus a mounting work of the light source to the light source housing chamber is easy.

The first and second holders are formed with resin.

The holder, which is dividable, includes a flexible connecting part and the connecting part connects the divided holders.

In this structure, an assembling work is further easy.

A reflecting surface corresponding to a light emitting part of the light source is provided on an inner surface of the light source housing chamber.

Therefore, a separate reflector for introducing light emitted from the light source is unnecessary because the display device of this invention is provided with the reflecting surface corresponding to the light emitting part of the light source, and mounting work of the separate reflector is not necessary and the assembling workability can be improved.

The light source housing chamber may include a light source holding part for holding the light source.

The display device of this invention may include a shading piece facing to the emitting surface of the light guide plate in a periphery of an incident surface.

In the display device of this invention, a back surface of the first holder is formed to be a reflecting surface and a reflecting sheet is not provided between the light guide plate and the back surface.

In the display device of this invention, the back surface of the first holder is formed in a predetermined shape so as to control light reflection and diffusion.

The foregoing and other objects, features, aspects and advantages of the present invention will become more apparent from the following detailed description of the present invention when collected conjunction with the accompanying drawings.

DESCRIPTION OF THE PREFERRED EMBODIMENTS

Explanation is made on an embodiment of the present invention by referring to the drawings.

Figure 1:
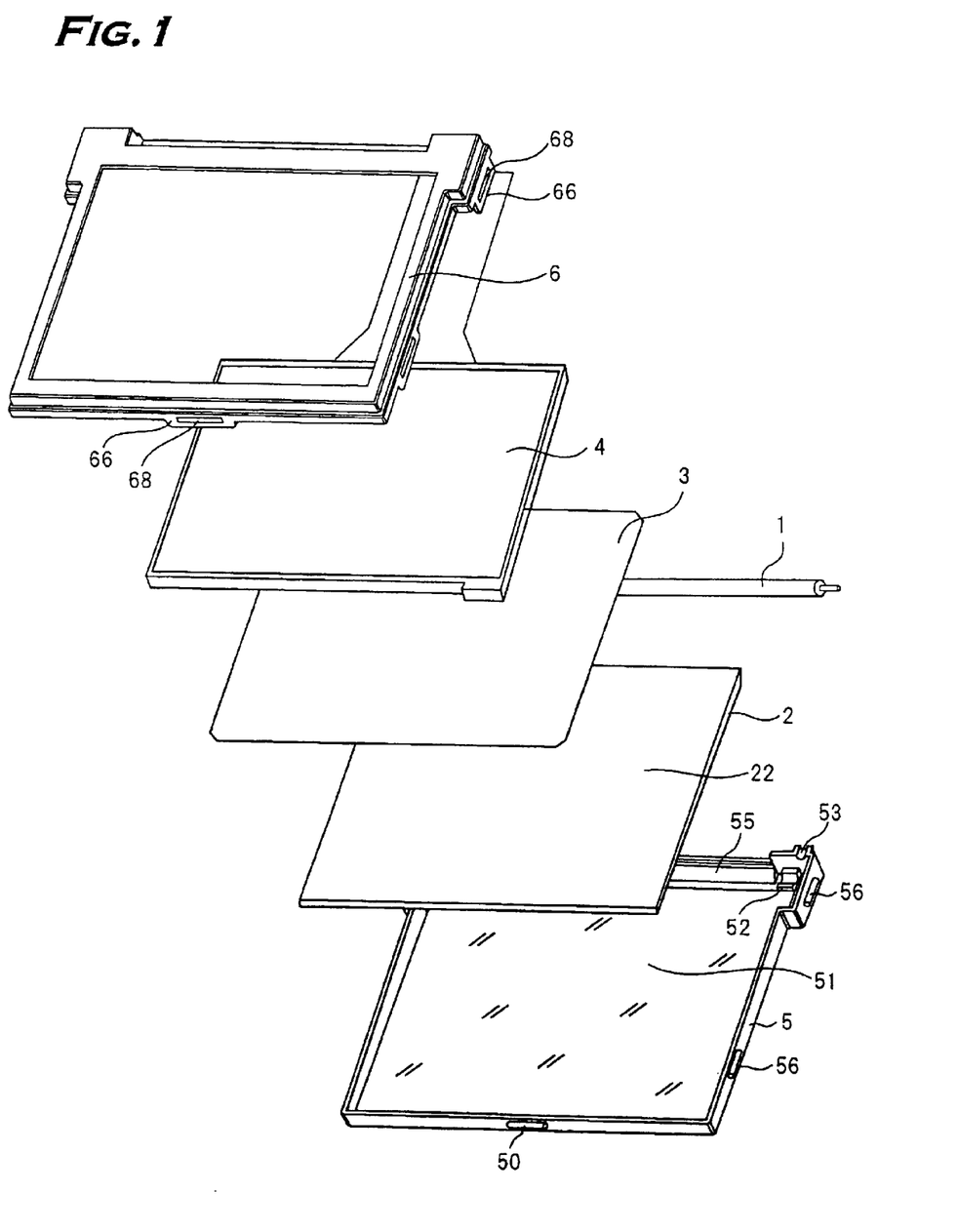
FIG. 1 is an exploded perspective view illustrating one of embodiments of a display device according to the present invention.
Figure 2:
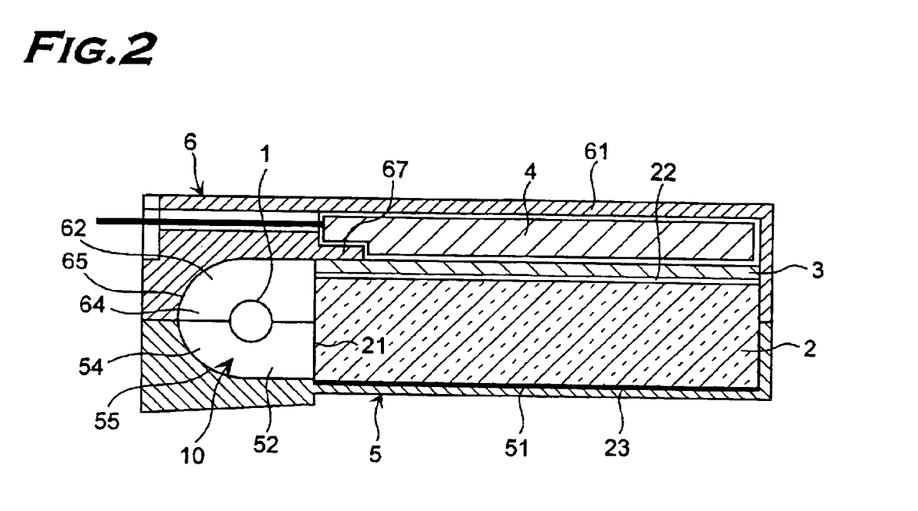
FIG. 2 is a cross sectional view schematically illustrating a composition of the display device of FIG. 1.

FIG. 1 is an exploded perspective view illustrating one of embodiments of a display device according to the invention, and FIG. 2 is a cross sectional view schematically illustrating a composition of the display device of FIG. 1.

A light source 1 comprises a cold cathode fluorescent light or the like for supplying light to the inside of a light guide plate (later described). A light guide plate 2 is formed with transparent material and includes an incident surface 21 as a surface for introducing light from the light source 1, an emitting surface 22 for emitting the light which introduced and travels through the inside of the light guide plate, and a back surface 23 opposing to the emitting surface 22. Although being not shown, the light guide plate 2 may have a group of lenses formed with top ridges of triangles for improving the brightness of the emitting light on the emitting surface. The thickness of the light guide plate 2 may reduce for improving the light emissivity. It means that a distance between the emitting surface 22 and the back surface 23 becomes smaller as it is farther from the light incident surface 21. Or, the light guide plate may have a diffusing pattern as diffusing means, which the light incident to the back surface 23 can be emitted from the emitting surface 22 with the even brightness.

Such light guide plates are generally formed by injection molding using thermoplastic resin. Therefore, even when the light guide plate has a group of lenses or a diffusing pattern, the light guide plate can be formed integrally and easily by a general forming process using a mold.

A diffusing plate 3, provided oppositely to the emitting surface 22 of the light guide plate 2, uniformly distributes the light emitted from the light guide plate 2. A transmission type liquid crystal display panel 4 as a non-light emitting display device is provided on a side of the emitting surface 22 of the light guide plate 2 by interposing the diffusing plate 3. A lens sheet for improving the brightness by condensing light may be provided above or beneath the diffusing plate 3. The diffusing plate 3 and the lens sheet may be provided depending on a desired property if necessary.

A first holder 5 holds the entire display device on a side of the back surface 23 of the light guide plate 2. A second holder 6 holds the entire display device on a side of a display surface of the liquid crystal display panel 4. The dividable first holder 5 and second holder 6 form a holder for housing the light source 1, the light guide plate 2, the diffusing plate 3, and the liquid crystal display panel 4.

Figure 3:
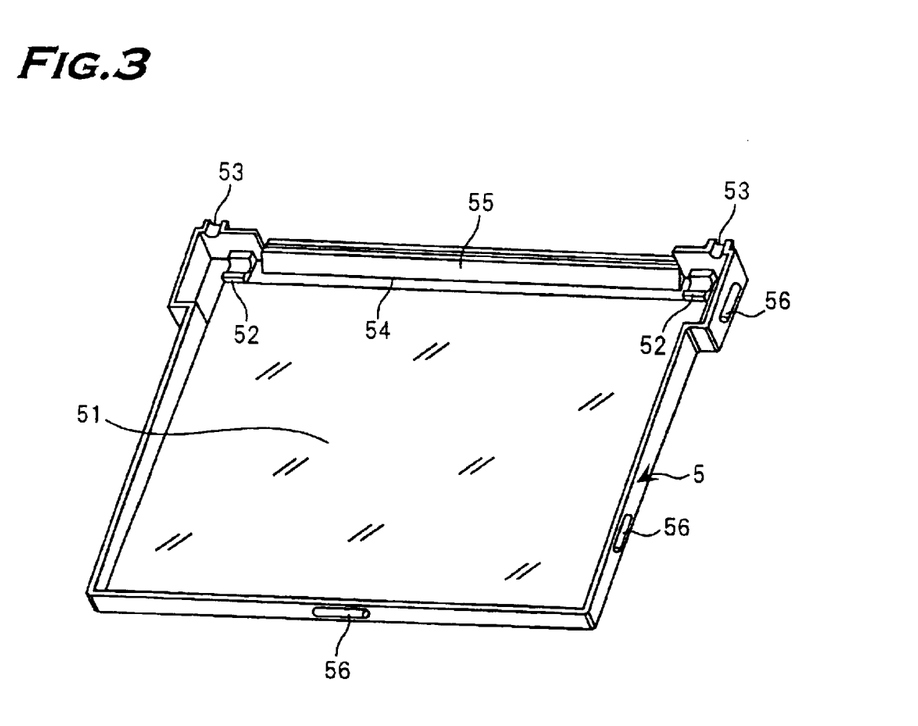
FIG. 3 is a schematic perspective view illustrating an inner side of a first holder of FIG. 1.
Figure 4:
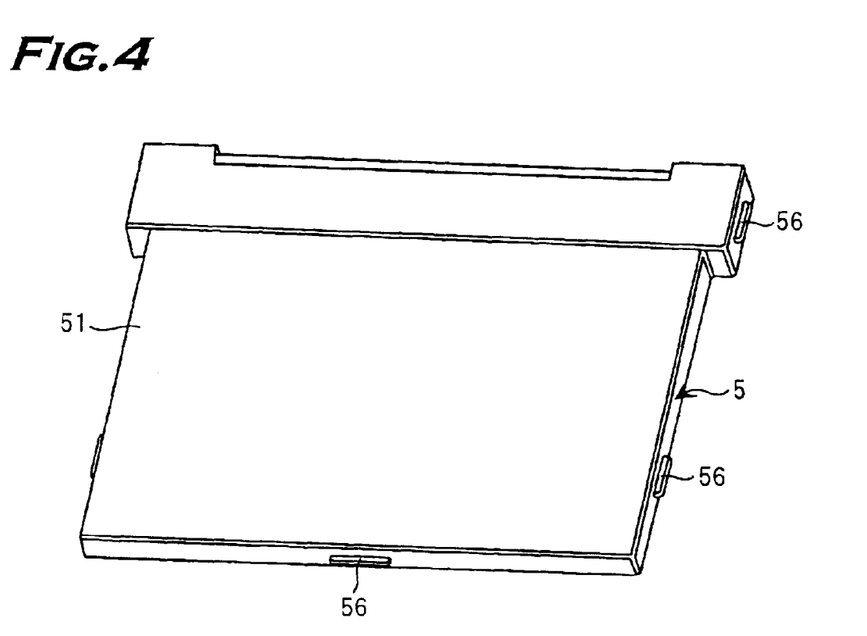
FIG. 4 is a schematic perspective view illustrating an outer side of the first holder of FIG. 1.

FIG. 3 is a schematic perspective view illustrating an inner side of the first holder 5 of FIG. 1, and FIG. 4 is a schematic perspective view illustrating an outer side of the first holder 5 of FIG. 1.

The first holder 5 includes a reflecting back surface 51, which faces to the back surface 23 of the light guide plate 2 and covers the back surface 23, and of which front surface is a reflecting surface. Also, included are a first light source holding portion 52 for pressing and holding the light source 1, a first electric wire holding portion 53 for pressing and holding an electric wire 11(see FIG. 9) for supplying electric power to the light source 1, a first housing area 54 for housing the light source 1 which has an opening corresponding to the incident surface 21 of the light guide plate 2 and is formed in a lower part of a light source housing chamber 10, and a first reflector 55 which has a reflecting surface corresponding to a light emitting portion of the light source 1 and is formed inside the first housing area 54.

Inner surfaces of the first holder 5 facing to surfaces except for the incident surface 21 and the back surface 23 of the light guide plate 2 are formed to be a reflection surface as like the reflecting back surface 51, and a plurality of protrusions 56 for assembling with the second holder 6 are provided on an outer periphery of the first holder 5. Although the reflecting back surface 51 is formed to be a mirror in this embodiment, the surface 51 as a reflecting surface may have asperities formed with cones or pyramids for controlling reflection and diffusion of light, or may have a plurality of recessed and protruded parallel lines having top ridges of cross-sectional triangles.

Figure 5:
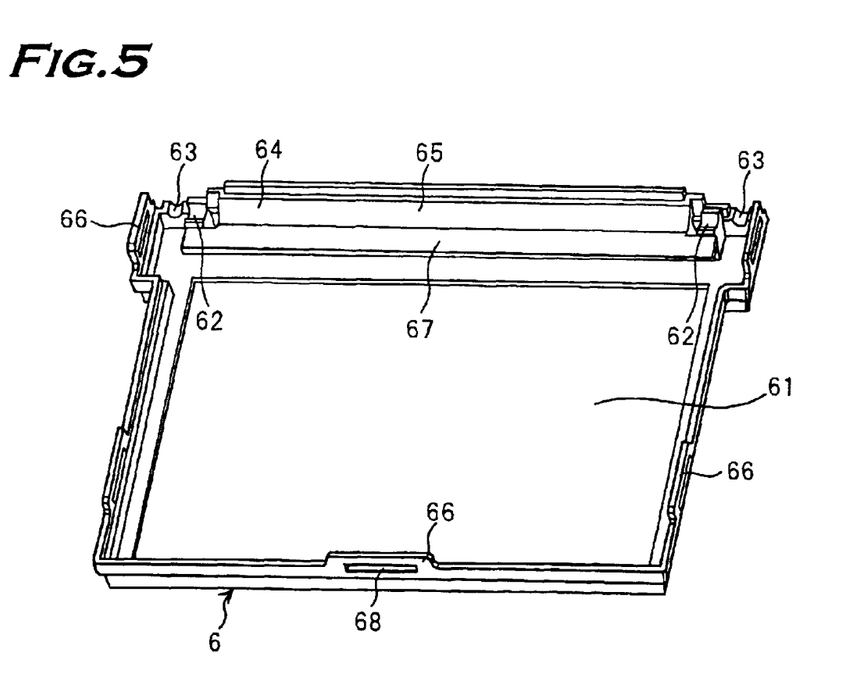
FIG. 5 is a schematic perspective view illustrating an inner side of a second holder of FIG. 1.
Figure 6:
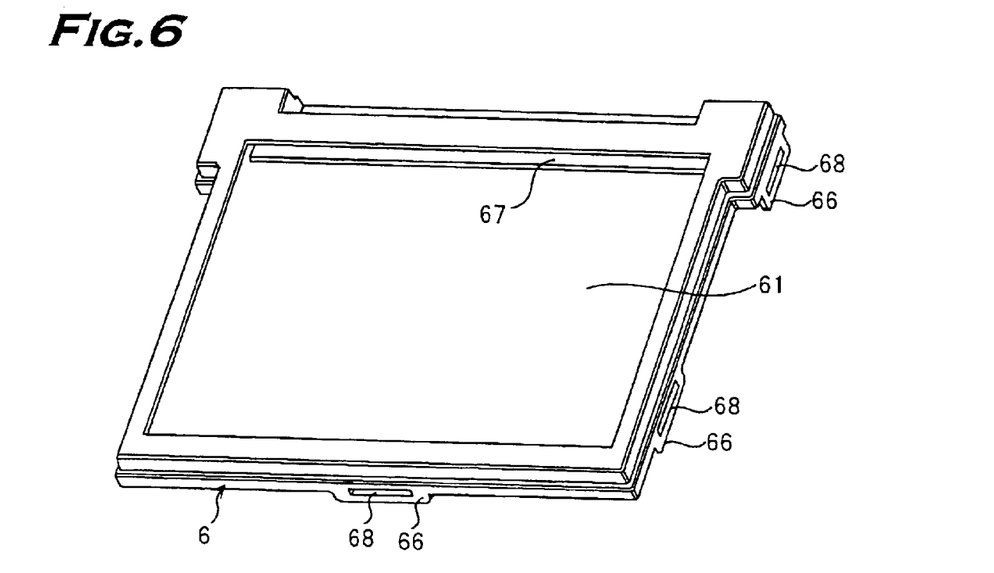
FIG. 6 is a schematic perspective view illustrating an outer side of the second holder of FIG. 1.

FIG. 5 is a schematic perspective view illustrating an inner side of the second holder 6 of FIG. 1, and FIG. 6 is a schematic perspective view illustrating an outer side of the second holder 6 of FIG. 1.

The second holder 6 includes an opening 61 corresponding to the display area of the liquid crystal display panel 4, a second light source holding portion 62 for pressing and holding the light source 1 which corresponds to the first holder 5, a second electric wire holding portion 63 for pressing and holding an electric wire 11 (see FIG. 9) for supplying electric power to the light source 1, a second housing area 64 for housing the light source 1 which has an opening corresponding to the incident surface 21 of the light guide plate 2 and is formed in an upper part of a light source housing chamber 10, and a second reflector 65 which has a reflecting surface corresponding to a light emitting area of the light source 1 and is formed in the second housing area 64. A shading piece 67 is integrally formed with the second reflector 65 in an opposite position to the emitting surface 22 in a periphery of the incident surface 21. Inner surfaces of the second holder 6 facing to side surfaces except for the emitting surface 22 of light from the light source 1 are formed to be a reflecting surface as like the reflecting back surface 51. In addition, a plurality of engaging portions 66 having engaging holes 68 for corresponding to and engaging with the protruded portion 56 are provided in an outer periphery of the second holder 6.

The first holder 5 and the second holder 6 are formed with resin such as polycarbonate which shades light and are mixed with white pigment or material for improving the reflectance (such as titanium dioxide) to make the entire body white and have high reflectance. Such first holder 5 and second holder 6 are easily formed by injection molding. The first and second holders 5, 6 may be formed with resin mixed with additive and pigment for chromaticity adjustment of emitted light and improvement of reflectance.

The light source 1, the light guide plate 2, the diffusing plate 3, and the liquid crystal display panel 4 are housed in the first and second holders 5 and 6, and then the protrusion 56 is fitted to the engaging hole 68 so as to be engaged with the engaging portion 66, and the holder and the display device are assembled. The outward appearance of the device is shown in FIG. 7.

Figure 7:
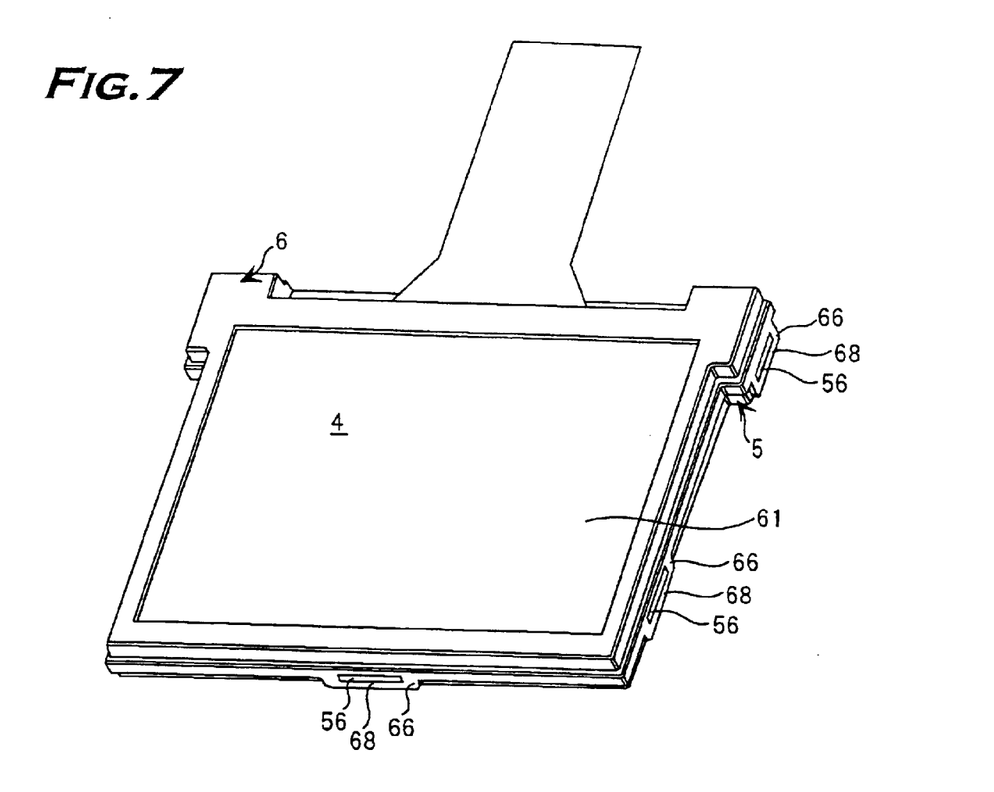
FIG. 7 is a schematic view illustrating an outward appearance of the display device of FIG. 1.

In FIG. 7 as like in FIG. 2, the holder is divided into the first and second holders 5, 6, and the light source housing chamber 10 is divided into the first and second housing areas 54, 64. Both ends of light emitting portion are supported and held by the first and second light source holders 52, 62 (see FIG. 9) so that the light source 1 is housed. The first reflector 55 and the second reflector 65 face with each other, wherein the reflectors having a reflecting surface of a predetermined shape for efficiently introducing light emitted from the light source 1 to the incident surface 21 are formed with a certain distance from the light source (the light emitting portion)in a periphery except for on a side of the light incident surface 21 of the light source 1. The shading piece 67 is opposite to the emitting surface 22 in the periphery of the incident surface 21.

When the light source 1 is tuned on, a part of light is directly incident to the incident surface 21, and other light is reflected on the first and second reflectors 55, 65, then is incident to the incident surface 21. The first and second reflectors 55, 65 do not deform by external force and the light source is hold by the first and second light source holding portions 52, 62, therefore a sufficient space between the light source 1 and the first and second reflectors 55, 65 are always maintained. Thus, little light reflected from the first and second reflectors 55 and 65 travels to the light source 1, and most of light reflected from the first and second reflectors 55 and 65 is incident to the incident surface 21 of the light guide plate 2. Light from the light source 1 is efficiently incident to the incident surface 21.

Light incident from the incident surface 21 travels inside the light guide plate 2, light reflected to the back surface 23 and light leaked from the back surface 23 is reflected to the reflecting back surface 51 of the first holder 5 and is incident to the light guide plate 2 again, then is emitted from the emitting surface 22. The light emitted from the emitting surface 22 illuminates the liquid crystal display panel 4 from behind through the diffusing plate 3. The shading piece 67 can prevent light from leaking from the light source 1 and from directly illuminating the display area of the liquid crystal display panel 4 from behind. Only the light emitted from the light guide plate 2 illuminates the display area and degradation of evenness of the illumination brightness can be prevented.

In the above embodiment, the holder for holding the entire display device is divided into two pieces, and the light source housing chamber 10 for housing the light source 1 is also divided into two pieces. Thus, it becomes easy to mount the light source 1 to the light source housing chamber 10 (in an actual work, the both ends of the light source 1 are respectively fitted to the light source holding portions 52, 62 of the first and second holders 5, 6). The first and second reflectors 55, 65 are provided in the dividable light source housing chamber 10, wherein the reflectors are integrally formed with the holders and have a reflecting surface corresponding to the light emitting portion of the light source 1. Thus, separate reflectors are not necessary for efficiently introducing light from the light source to the incident surface 21. Therefore, a fixing work of separate reflectors is not necessary, thus improving the assembling workability.

As the reflecting back surface 51 facing to the back surface 23 of the light guide plate reflects light, a reflecting sheet generally provided opposite to the back surface 23 of the light guide plate is not necessary. The first and second electric wire holding portions 53, 63 for holding the electric wire for supplying power to the light source 1 also serves as protectors of a connecting portion of the electric wire and an electrode of the light source 1. Thus, a protection material (bush) such as insulating rubber generally provided on the connecting portion of the electric wire and the electrode of the light source is not necessary.

The light source 1 and the light guide plate 2 are housed in the first and second holders 5 and 6. Al the surfaces of the light source 1 and the light guide plate 2 except for a surface facing to an opening 61 are covered with the first and second holders 5, 6. Thus, light emitted from the light source 1 and the light incident to the light guide plate 2 is prevented from leaking from surfaces except for the emitting surface 23. Less light is leaked as compared with a metal holder, thus light from the light source 1 is used efficiently and the brightness of illuminating light can improve.

The dividable holders for holding the display device as well as the dividable light source housing chamber for housing a light source, the light source holding portion, the electric wire holding portion, and the predetermined inner surface serving as a reflecting surface make assembling works easy while ensuring accuracy of assembly, resulting in improved efficiency, parts number reduction, and cost decrease.

Furthermore, an outer periphery of the liquid crystal display panel 4 is covered with the first and second holders 5, 6. A metal frame for protection generally provided on an outer periphery of the liquid crystal panel is not necessary. In conjunction with this, the display device of this composition can prevent degradation of performance caused by corrosion, improve reliability of the display unit, as well as achieve reduction of the parts number and improve the brightness of illuminating light.

Figure 8:
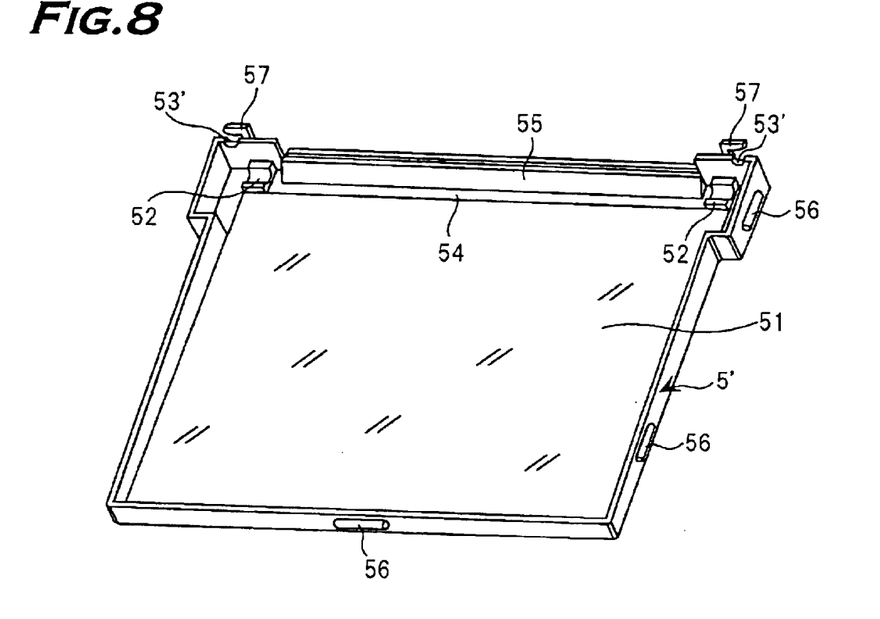
FIG. 8 is a schematic perspective view illustrating an inner side of another embodiment of the first holder.

FIG. 8 is a schematic perspective view illustrating an inner side of another embodiment of the first holder. A difference between the first holder 5' and the first holder 5 shown in FIG. 3 is that the first holder 5' is provided with an electric wire engaging portion 57 for engaging an electric wire corresponding to the first electric wire holding portion 53'. (the same elements as those of the first holder 5 have the same reference numerals and explanation on those is omitted)

Figure 9:
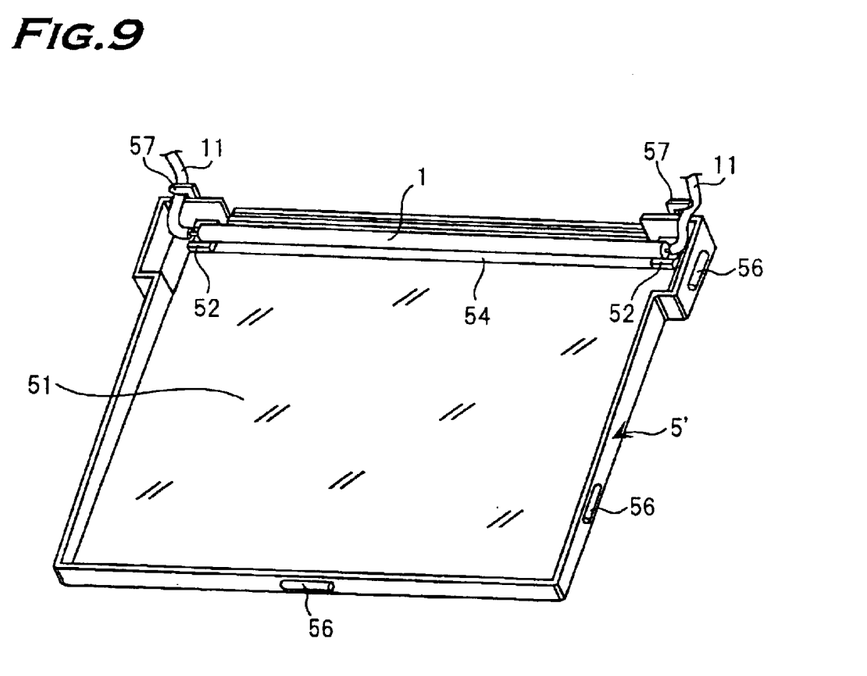
FIG. 9 is a view illustrating the first holder of FIG. 8 which a light source is mounted.

When a light source 1 is mounted to the light source housing chamber 10, as shown in FIG. 9, both ends of the light source 1 are fitted to the first light source holding portion 52 of the first holder 5' and the electric wire 11 is engaged with and hung to the electric wire engaging portion 57. The electric wire 11 is remained to be hung to the first electric wire holding portion 53', and the light source 1 is kept being held to the first holder 5'. Thus, the assembling work for engaging the second holder 6 becomes very easy, improving the assembling workability.

Figure 10:
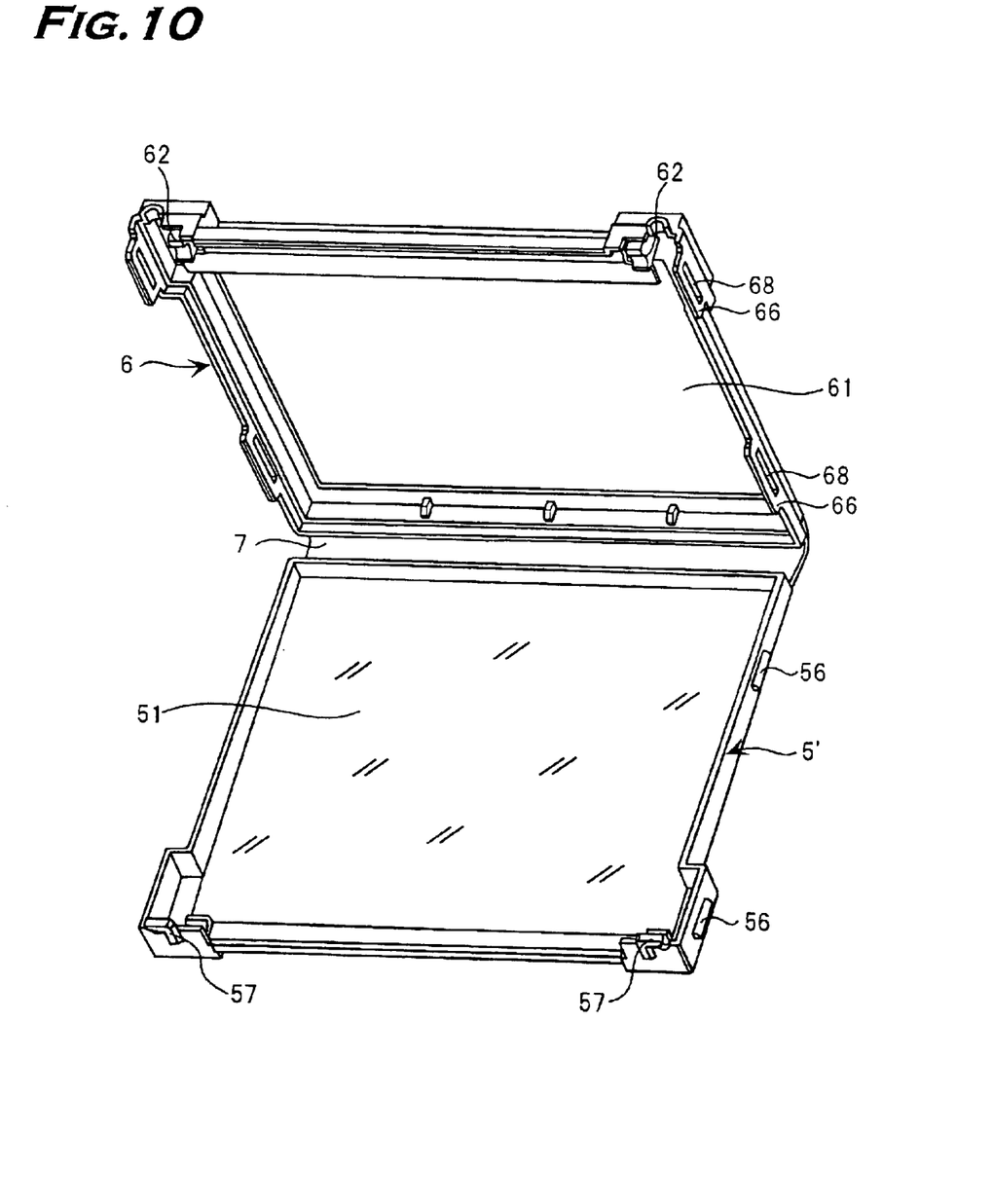
FIG. 10 is a view illustrating another embodiment of the holder according to the invention.

As shown in FIG. 10, when the first holder 5' (or the holder 5) and the second holder 6 are combined by a flexible connector 7, the assembling work also becomes easy The first holder 5' and the second holder 6 are formed with resin and are connected by a connector on a side opposite to the light source. And the connector 7 is formed to be thinner than the holders so as to be flexible. When assembling, the light source, the light guide plate, and the diffusing plate are housed in the first holder 5', and the liquid crystal display panel is housed in the second holder 6. Then the first holder 5' and the second holder 6 are engaged with each other to form the display device unit.

In the present invention, the dividable holders for holding the entire display device and the dividable light source housing chambers for housing a light source are formed, thus a mounting work of a light source to the light source housing chamber becomes easy. The first and second reflectors including a reflecting surface corresponding to a light emitting portion of a light source are integrally formed with the holders in the dividable light source housing chamber, thus a separate reflector is not necessary and troublesome assembling works for the separate reflector can be omitted. The first and second reflectors can be kept in a predetermined shape without deformation, and a uniform space between the light emitting portion of the light guide plate and the first and second reflectors can be secured. Therefore, the incidence efficiency of light from the light source to the light guide plate can be enhanced and sufficient brightness of illuminating light can be secured. A display device of excellent display performance and illumination performance can be provided.

The light source holding portion and the electric wire holding portion can make assembling works easy and improve assembling workability while realizing accuracy in assembling works. Furthermore, the invention can contribute to reducing the number of parts and cost for a product and improving reliability of a product.

Although the present invention has been described and illustrated in detail, it is clearly understood that the same is and example only and is not to be taken by way of limitation by way of illustration, the spirit and scope of the present invention being limited only by the terms of the appended claims.

What is claimed is:

1. A display device comprising:
   a light source;
   a light guide plate for introducing light emitted by the light source to an incident surface on a side of the light guide plate and emitting the light from an emitting surface;
   a non-light emitting display device which is illuminated by light emitted from the light guide plate; and
   a holder for housing the light source, the light guide plate, and the non-light emitting display device,
   wherein the holder includes:
      a first holder having a back surface covering at least the entire back surface of the light guide plate;
      a second holder, covering at least the entire front surface of the light guide plate,
      wherein the second holder has an opening with length and width dimensions corresponding to length and width dimensions of a display area of the non-light emitting display device, and
      wherein the second holder is formed dividably from the first holder, and
      wherein a light source housing chamber for housing the light source having an opening corresponding to the incident surface of the light guide plate is formed by combining the first and second holders,
      wherein the holder is dividable into at least first and second parts,
      wherein the first and second parts are connected by a flexible connecting part that attaches to the first and second parts, and
      wherein the flexible connecting part is formed to be thinner than the first and second parts.

2. The display device according to claim 1, wherein the first holder includes a first housing area formed in a lower part of the light source housing chamber, and the second holder includes a second housing area formed in an upper part of the light source housing chamber.

3. The display device according to claim 1, wherein the first and second holders are formed with resin.

4. The display device according to claim 1, wherein a reflecting surface corresponding to a light emitting part of the light source is provided on an inner surface of the light source housing chamber.

5. The display device according to claim 1, wherein the light source housing chamber includes a light source holding part for holding the light source.

6. The display device according to claim 1, wherein the second holder includes a shading piece facing to the emitting surface of the light guide plate in a periphery of an incident surface.

7. The display device according to claim 1, wherein a back surface of the first holder is formed to be a reflecting surface and a reflecting sheet is not provided between the light guide plate and the back surface.

8. The display device according to claim 1, wherein the back surface of the first holder is formed in a predetermined shape so as to control light reflection and diffusion.

9. The display device according to claim 1, wherein light emitted from the light source and light incident to the light guide plate is prevented from leaking from the surfaces except for the emitting surface because all surfaces of the light source and the light guide plate except for a surface facing to the opening of the second holder are covered with the first and second holders.

* * * * *